United States Patent [19]

Hayashi

[11] Patent Number: 4,784,112

[45] Date of Patent: Nov. 15, 1988

[54] CONTAINER FOR USE IN PRECOOKED FOODS

[76] Inventor: Yuichi Hayashi, 444-7, Hikawacho, Soka-shi, Saitama-ken, 340, Japan

[21] Appl. No.: 161,236

[22] Filed: Feb. 18, 1988

Related U.S. Application Data

[63] Continuation of Ser. No. 926,614, Nov. 4, 1986, abandoned.

[30] Foreign Application Priority Data

Feb. 13, 1986 [JP] Japan .............................. 61-18278[U]

[51] Int. Cl.$^4$ .............................................. A47G 23/04
[52] U.S. Cl. ........................................ 126/262; 220/8; 126/261; 126/38
[58] Field of Search ............... 126/262, 261, 265, 266, 126/43, 38, 267; 220/8

[56] References Cited

U.S. PATENT DOCUMENTS

| 750,632 | 1/1904 | Fisher | 220/8 X |
| 896,719 | 8/1908 | Gerbrecht et al. | 126/262 |
| 3,838,680 | 10/1974 | Shipman | 126/215 X |
| 4,102,323 | 7/1978 | Pritz | 126/261 |
| 4,424,798 | 1/1984 | Volk | 126/262 |

FOREIGN PATENT DOCUMENTS

| 73654 | 12/1914 | Austria | 126/262 |
| 975669 | 10/1950 | France | 126/262 |

Primary Examiner—Randall L. Green
Attorney, Agent, or Firm—Armstrong, Nikaido, Marmelstein & Kubovcik

[57] ABSTRACT

The container for use in precooked foods comprises a disposable container main body for containing precooked foods made of incombustible material and a disposable heater device made of incombustible material such as incombustible paper or aluminum, having a solid fuel, packaged integrally together with the container main body and capable of heating the main body. The container main body and the heater device are engaged to each other by fitting the protrusions on the main body into the lateral grooves in the heater device so that the main body can be supported at a raised position above the heater device. The container main body may include a cylindrical bellows portion that can vary the capacity of the container by expansion and compression.

4 Claims, 4 Drawing Sheets

CONTAINER FOR USE IN PRECOOKED FOODS

This application is a continuation of application Ser. No. 926,614, filed 11/4/86, now abandoned.

BACKGROUND OF THE INVENTION

1. Field of the Invention

This invention concerns a container for use in precooked or convenient foods such as of Chinese noodles, Japanese noodles, solidified soups and like other so-called instant foods. Paticularly, it relates to a disposable container for use in precooked foods combined with a heater device in an integrally packaged manner.

2. Description of the Prior Art

Precooked foods or convenient foods contained in a container and, upon serving, poured with hot water and then immersed therein for a predetermined of time have now generally been known as so-called instant foods. Although these precooked foods provide various merits in that they are easy to cook and convenient to carry about, preparation of hot water is required for serving them, which is troublesome and inconvenient, for example, upon taking them outdoor as field rations.

Further since the volume of the precooked foods is increased when hot water is poured for cooking, the capability of the container has to be increased by so much and, accordingly, the container becomes bulky upon packaging, transportation and storing thus making it more expensive.

SUMMARY OF THE INVENTION

It is, accordingly, a primary object of this invention to provide a container for use in precooked foods in which a disposable heater device is combined with a main body of the container thereby facilitating the cooking of foods with no requirement for troublesome preparation of hot water.

Another object of this invention is to provide a variable-capacity container for use in precooked foods capable of optionally varying the capacity of the container such that the capacity is decreased upon packaging, transportation and storing, whereas it is increased upon cooking.

The foregoing primary object of this invention can be attained by a container for use in precooked goods, comprising a disposable container main body for containing precooked foods and a disposable heater device composed of incombustible material such as incombustible paper or aluminum, having a solid fuel, packaged integrally together with the container main body and capable of heating the main body.

Another object of this invention can be attained by a container for use in precooked foods as described above, in which a cup member of the container main body is partially or fully composed of an extensible bellows type cylindrical member.

BRIEF DESCRIPTION OF ACCOMPANYING DRAWINGS

These and other objects, as well as the features of this invention will become apparent by reading the following descriptions for preferred embodiments of this invention while referring to the accompanying drawings, wherein FIG. 1 is a perspective view for illustrating one embodiment of the container for use in precooked foods according to this invention;

DETAILED DESCRIPTION OF THE INVENTION

Figure 1:
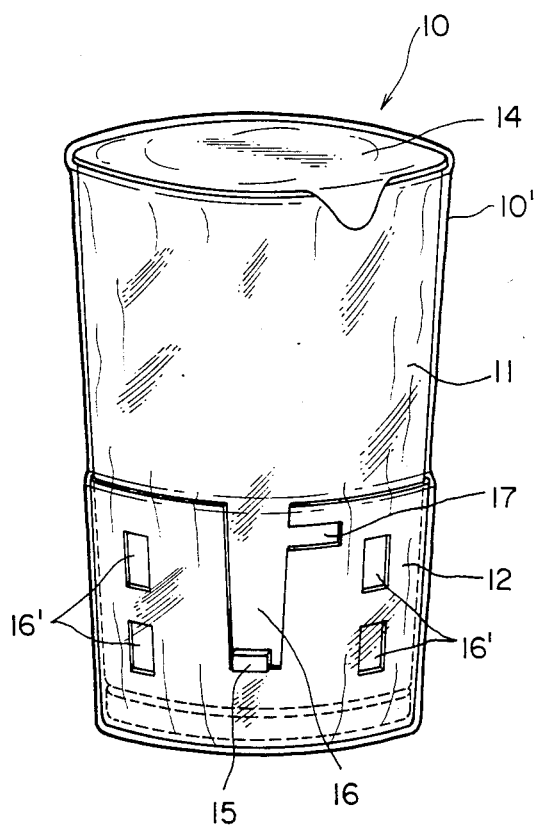

FIG. 1 shows the entire portion of a container 10 for use in precooked foods according to this invention. The container 10 comprises a container main body 11 for containing precooked foods such as seasoned and dried noodles or solidified soups and a heater 12 for heat-cooking the foods in the container, which are integrally packaged within a film material 10.

Figure 2:
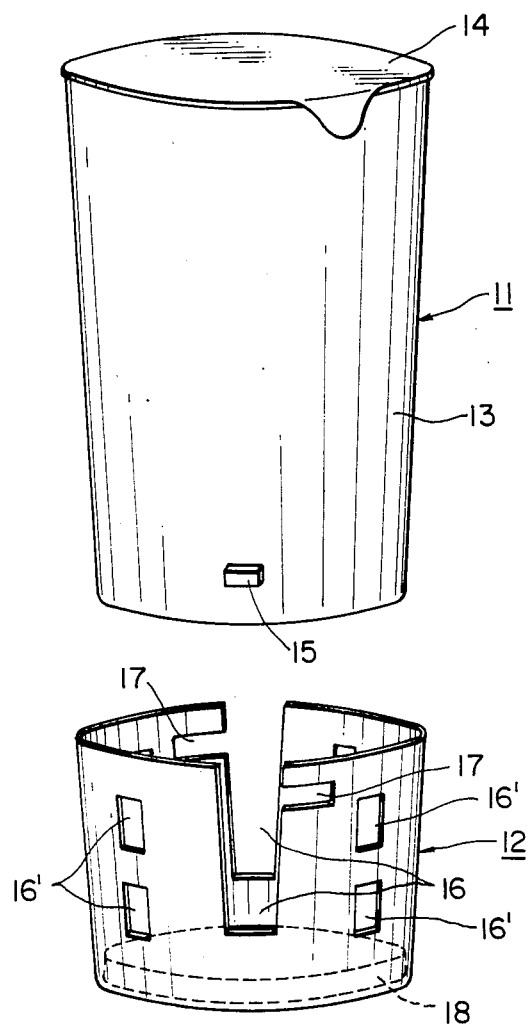
FIG. 2 is perspective view for components constituting the container according to this invention.
Figure 3:
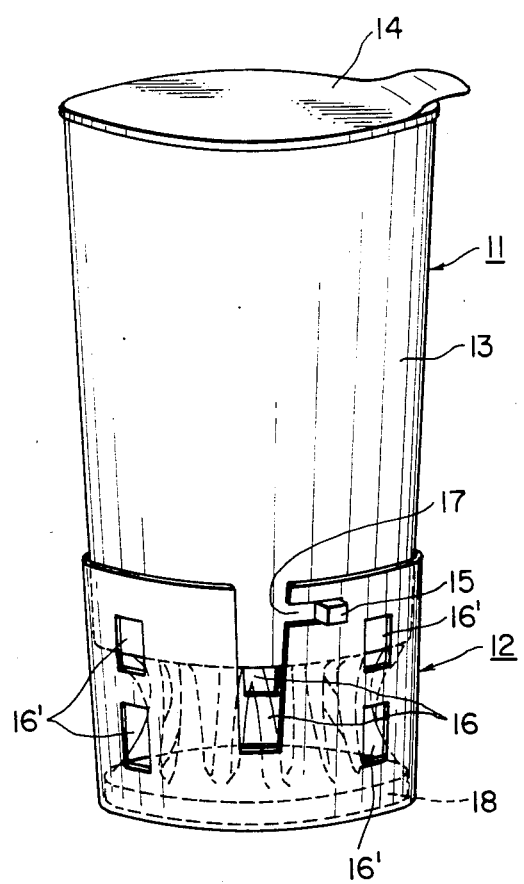
FIG. 3 is perspective view illustrating the container according to this invention in use.

As shown in FIG. 2, the container main body 11 comprises a cup member 13 made of incombustible paper or aluminum foil and a removable cover 14 made of paper which is tightly sealed to the main body 11 after containing the precooked foods such as instant Chinese noodles (not illustrated). Protrusions 15 are formed at two positions along the lower circumferential surface of the cup member 13 (only one of them being illustrated).

As shown in FIG. 2, the heater 12 is shaped into a cup-like configuration made of incombustible material such as incombustible paper or aluminum foil having wide recesses 16, 16 formed, preferably, at two positions on the upper edge portion.

As shown in FIG. 1, the heater 12 is engaged to the lower portion of the cup member 13 by fitting the protrusions 15 into the mating recesses 16 respectively and then packaged integrally together with the cup member 13. Further, the heater 12 has lateral grooves 17, 17 disposed, preferably, by two near the opening edge and extended laterally along the side wall, so that the protrusions 15, 15 on the container main body 11 can be fitted to the grooves 17, 17 to situate the cup member 13 at a predetermined height above the heater 12. Further, the heater 12 includes in its inside a solid fuel 18 which is just sufficient to heat the precooked foods in the container main body 11 into a state capable of serving. Both of the container main body 11 and the heater 12 are disposable.

Air required for the combustion of the solid fuel 18 enters through the recesses 16 into the heater 12 and, if necessary, an additional air supply port 16' may further be disposed to the side wall of the heater 12 as shown in the drawing.

The container 10, having the foregoing constitution, is sold in a state where the container main body 11 containing the precooked foods and the heater 12 fitted to the lower portion of the container are integrally packaged together.

Upon using the container, while partially opening the cover 14 for the container main body 11 and pouring water into the main body 11, the cup member 13 is raised and the protrusions 15 are fitted to the lateral grooves 17 to define a combustion space above the heater 12. Then, when the solid fuel 18 is ignited through the recesses 16 by way of a match or the like, the solid fuel 18 is burnt with the air intaken through the recesses 16 to boil the water in the cup member 13 thereby heating and cooking the precooked foods. The amount of the solid fuel 18 is such that the precooked foods are just put into a state capable of serving when the fuel has completely been exhausted.

Although the cup member of the container main body is made of incombustible material in the above-mentioned embodiment, it may also be made of common paper provided that the container has such a shape as having no circumferential edge at the bottom that will easily catch the fire from the solid fuel but a flat bottom face that is evenly chilled through the bottom wall by the water charged in the container main body. Further, the heater is designed to fit to the lower portion of the container main body in the foregoing embodiment, but it may be contained integrally to the inside of the container main body. That is, various structures may be adopted so long as the heater can be packaged integrally together with the container main body.

Figure 4:
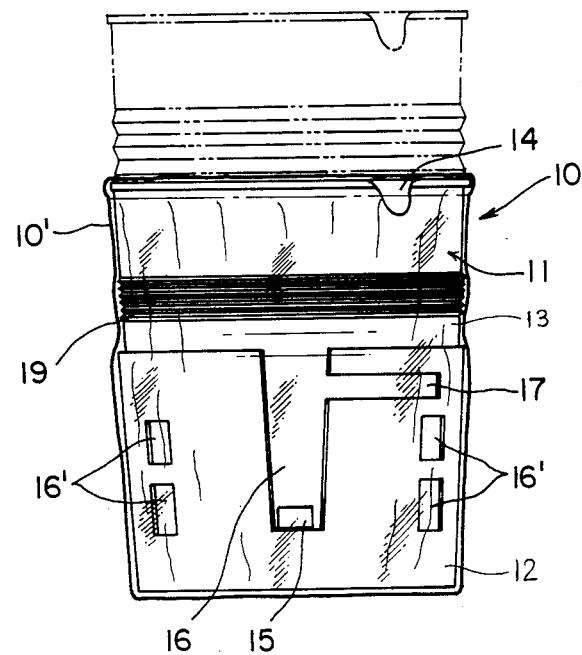
FIG. 4 is a perspective view of a container illustrating another embodiment according to this invention.

FIG. 4 shows a modified embodiment according this invention. In this embodiment, the cup member 13 of the container main body 11 includes an extensible and shrinkable cylindrical portion 19 disposed in a bellows-like manner such that the capacity of the entire container can be varied by the extension and the contraction of the bellows.

Generally, the precooked foods in the freeze-dried state are cooked by pouring hot water to return them into the initial form ready for serving. In this case, since the volume of the foods is increased upon pouring the hot water, the container main body is designed to have such a capacity as capable of affording the increment of the volume in addition to the volume of the foods themselves. In the embodiment shown in FIG. 4, the container main body 11 is compressed so as to decrease the capacity upon packaging, transportation, storing or the like, whereas the body portion of the container is enlarged to an extent shown by the chained line in FIG. 4 upon heat-cooking such that the capacity can be increased.

In the illustrated embodiment, although the bellows type cylindrical portion 19 is disposed to a part of the cup member 13, the cylindrical portion 19 may be disposed over the entire length of the cup member 13.

As has been described above, since the container for use in precooked foods according to this invention is equipped with a heater device having a solid fuel, preparation of hot water upon cooking is no more necessary but the foods can be cooked for serving by merely using ordinary water not heated, by which precooked foods can be cooked extremely conveniently. Further, if the precooked foods already contain liquid components such as in the case of soups, supply of external water can also be saved, whereby the cooking of the precooked foods can further be simplified. In addition, when the container according to this invention is used, since the precooked foods are not only cooked by merely adding hot water but completely boiled and digested, heat-cooking for the precooked foods can be made sufficiently to enjoy more delicious precooked foods.

Accordingly, the container of this invention enables to serve hot-cooked foods extremely simply and it can be applied widely for various precooked foods including Chinese noodles, Japanese noodles, soups, rice-in-teas, miso-soups, coffees, teas and the likes.

Furthermore, in the modified embodiment in which the capacity of the container main body is made variable by the expansion and compression, the container can be made less bulky upon packaging, transportation, and storing, whereas it is increased upon use corresponding to the increased amount of the precooked foods upon cooking and, accordingly, it can provide a merit capable of reducing the transportation cost or the like.

What is claimed is:

1. A container for use in heating precooked foods comprising a disposable container main body composed of incombustible paper for containing precooked foods and a disposable heater device composed of incombustible material such as incombustible paper or aluminum, having a solid fuel, integrally packaged together with said container main body and capable of heating said main body, said heater device having a bottom wall supporting said solid fuel, an upwardly extending side wall and an open top for receiving said container main body and slidable thereon, said heater device having a plurality of recesses extending vertically of said upwardly extending side wall, said vertical recesses being open at the top and each having a laterally extending groove, said main body having an outwardly extending protrusion engaged in each of said vertical recesses for movement in said vertical recesses when said main body is lifted relative to said heater device and for engagement in said lateral grooves when said lifted main body is rotated in a first direction relative to said heater device and for disengagement with said lateral grooves and re-engagement with said vertical recesses for lifting said main body out of said heater device and separating said main body from said heater device when the main body is rotated relative to said heater device in the reverse direction.

2. A container for use in precooked foods as defined in claim 1, wherein the heater device is fitted to the lower portion of the container main body.

3. A container for use in precooked foods as defined in claim 2, wherein said protrusions are at the lower circumferential surface of said main body.

4. A container for use in precooked foods as defined in claims 1, 2 or 3, wherein the container main body is partially or fully composed of an extensible bellows type cylindrical portion.

* * * * *